3,637,808
BENZOIC ACID ESTERS OF 1-PHENYL-1-BENZYL-
2-METHYL-3-DIMETHYLAMINO-PROPANOL
Luigi Fontanella, Milan, Italy, Emilio Testa, Ticino, Switzerland, and Giulio Maffii, Milan, Italy, assignors to Lepetit S.p.A.-Gruppo per la Ricerca Scientifica e la Produzione Chimica Formaceutica, Milan, Italy
No Drawing. Filed Jan. 22, 1968, Ser. No. 699,312
Claims priority, application Great Britain, Feb. 17, 1967, 7,774/67
Int. Cl. C07c 93/00
U.S. Cl. 260—477          4 Claims

ABSTRACT OF THE DISCLOSURE

Esters of 1-phenyl-1-benzyl-2-methyl-3-dimethylamino-propanol with benzoic acid and derivatives thereof. These compounds are useful as coronary-vasodilators.

---

This invention is concerned with a new class of compounds and with a method for preparing them. More particularly the compounds of the invention are basic esters, and salts thereof, of the formula

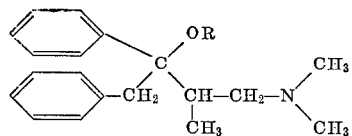

(I)

wherein R is an acyl of the formula

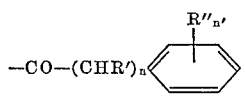

wherein $n$ is an integer from 0 to 4, $n'$ is an integer from 0 to 3, $R'$ is a member of the group consisting of hydrogen, fluorine and chlorine, $R''$ is a member of the class consisting of halogen, nitro, lower alkyl and lower alkoxy.

The process for preparing the new class of compounds consists in refluxing a compound of the formula

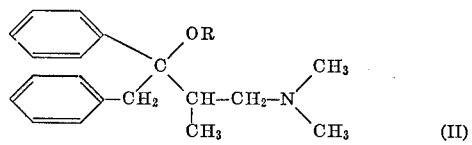

(II)

with an amount at least equimolecular of the halogenide of an acid, having the formula

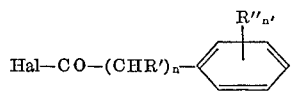

wherein $n$, $n'$, $R'$ and $R''$ have the above significance, and Hal is a halogen atom. The reaction is carried out in an inert anhydrous solvent at the boiling temperature of the reaction mixture for a time up to 10 hours.

It will be apparent to all those skilled in the art that the compounds of the invention may exist both in racemic and optically active forms due to the presence of asymmetric substituent on carbon atoms. When an end compound in the racemic form is desired, a racemic starting compound is selected. On the contrary, if an optically active starting compound is used, the end compound will obviously be also optically active.

It is also entirely apparent that the optically active starting substances may be prepared by resolving the corresponding racemates through well known procedures, for instance by salification with an optically active acid, such as D-camphorsulfonic acid.

The compounds of the invention are of pharmacological interest, since they were found to possess a coronary-vasodilator activity in a high degree.

Experiments carried out on isolated guinea-pig heart, according to Langendorff's method (Pflüger's Arch. Ges. Physiol. 1895, 61, 291) showed that this class of compounds are, under the same conditions of toxicity, markedly more active than papaverine, which is well known coronary-vasodilator. The observed increases in coronary blood flow, respectively 30 seconds and 3 minutes after the administration of the drug, are reported in Table 1, wherein also the toxicity on mice is given for a better evaluation of the pharmacological properties of said compounds in comparison with papaverine.

TABLE 1

| Compounds | Dose γ | Percent increase of coronary blood flow after— | | $LD_{50}$ i.p., mice |
|---|---|---|---|---|
| | | 30 sec. | 3 min. | |
| Example: | | | | |
| 2 | 20 | 233 | 77 | 540 |
| 4 | 20 | 213 | 75 | 433 |
| 5 | 20 | 138 | 27 | 900 |
| Papaverine | 20 | 140 | 29 | 86 |

The action regarding the coronary circulation was further investigated on anesthetized dogs, by measuring the increase of the coronary blood flow in a branch of the left coronary artery. At the same time the arterial femoral blood pressure, the heart contraction, and the heart rate were determined.

TABLE 2

| Compounds | Dose, mg./kg. | Coronary blood flow increase, percent | Femoral blood pressure variation, mm. Hg | Heart contraction variation, percent | Heart rate variation, percent |
|---|---|---|---|---|---|
| Example: | | | | | |
| 2 | 0.25 | +22 | −2 | 0 | +3 |
|   | 0.5 | +33 | −3 | +16 | 0 |
|   | 1 | +61 | −12 | +11 | −2 |
|   | 2 | +64 | −22 | +42 | −8 |
| 4 | 0.25 | | | | |
|   | 0.5 | | | | |
|   | 1 | +91 | −24 | −12 | −3 |
|   | 2 | +110 | −44 | +27 | −14 |
| 5 | 0.25 | | | | |
|   | 0.5 | | | | |
|   | 1 | +63 | −20 | | 0 |
|   | 2 | +108 | −24 | −9 | +5 |
| Papaverine | 0.25 | +48 | −10 | +38 | +13 |
|   | 0.5 | +41 | −9 | +33 | +5 |
|   | 1 | +107 | −28 | +41 | +7 |
|   | 2 | +212 | −67 | +33 | +15 |

By considering the above data, it stands out that the compounds described in the application cause a marked effect on the coronary blood flow, which is much higher than the one produced by papaverine if reference is made to the same values of toxicity. An other favourable aspect of our compounds, in comparison with papaverine, is represented by the smaller undesired side effects, such as the variation of blood pressure, of heart contraction and heart rate. The compounds forming the subject matter of the application can be administered by oral route, admixed with a suitable carrier at a dose ranging from 0.1 to 1.5 g. When the intramuscular or intravenous route administration is selected, the dose is 0.1–0.5 g.

The following non limitative examples illustrate the invention.

EXAMPLE 1

Preparation of (+) 1-phenyl-1-benzyl-2-methyl-3-dimethylaminopropyl benzoate

In a distillation flask 2.8 g. of (+) 1-phenyl-1-benzyl-2-methyl-3-dimethylaminopropanol and 1.6 g. of benzoyl chloride are dissolved in 40 ml. of anhydrous pyridine and refluxed for 6 hours. Then the solvent is distilled off in vacuo, the residue is taken up with dilute hydrochloric acid, and the mixture extracted with diethyl ether. The ether phase, containing the unreacted benzoic acid, is discarded and the aqueous solution is made alkaline by adding a 10% solution of sodium carbonate. The free base formed is extracted with diethyl ether, the combined ether extracts are dried over anhydrous sodium sulphate and the solvent distilled off. The oily residue is crystallized from petroleum ether, yield 3.25 g., M.P. 113–114° C. $[\alpha]_D^{20}$+110.4° (c.=1 in chloroform).

EXAMPLE 2

Preparation of (+) 1-phenyl-1-benzyl-2-methyl-3-dimethylaminopropyl fluorophenyl-acetate A mixture of 10.8 g. of (+) 1-phenyl-1-benzyl-2-methyl-3-dimethylaminopropanol and 7.6 g. of fluorophenyl-acetyl chloride, dissolved in 135 ml. of anhydrous pyridine, is refluxed for seven hours. The solvent is removed by distilling in vacuo, and the residue taken up with dilute hydrochloric acid. The supernatant oily layer is decanted and the aqueous solution extracted with diethyl ether. The ether solution, containing the excess of the α-fluoroacetic acid is discarded. The oily layer combined with the aqueous acid solution is added with 10% sodium carbonate solution, and the free base extracted with diethyl ether. The ether extracts are decolorized with charcoal, filtered and dried over anhydrous sodium sulfate. After removing the solvent, the residue is crystallized from petroleum ether, yield 13.1 g., M.P. 91–93° C. $[\alpha]_D^{20}$ +52.4° C. (c.=1 in chloroform).

EXAMPLE 3

Preparation of (−) 1-phenyl-1-benzyl-2-methyl-3-dimethylaminopropyl fluorophenyl-acetate It is prepared by the same process described under Example 2, from 6 g. (−) 1-phenyl-1-benzyl-2-methyl-3-dimethylaminopropanol and 4.8 g. of fluorophenyl-acetyl chloride, yield 6.7 g., M.P. 91–93° C. $[\alpha]_D^{20}$ −50.6° (c.=1 in chloroform).

The starting compounds, i.e. the (−) 1-phenyl-1-benzyl-2-methyl-3-dimethylaminopropanol, is prepared by salification of the corresponding racemate with an equimolecular amount of D-camphorsulfonic acid and by fractionate crystallisation from ethanol. The desired isomer thus resolved as salt of the D-camphorsulfonic acid, is reacted with a dilute sodium hydroxide solution, the free base is extracted with diethyl ether, and recovered by distilling off the solvent.

EXAMPLE 4

Preparation of (+) 1-phenyl-1-benzyl-2-methyl-3-dimethylaminopropyl p-chloro-benzoate In a distilling ask, containing 125 ml. of anhydrous pyridine, 10 g. of (+) 1-phenyl-1-benzyl-2-methyl-3-dimethylaminopropanol and 7 g. of p-chloro-benzoyl chloride are refluxed for 9 hours. The solvent is distilled off in vacuo and the residue is taken up with dilute hydrochloric acid. The supernatant oily layer is separated, then the aqueous phase is extracted with diethyl ether. The ether extracts containing the unreacted p-chlorobenzoic acid are discarded. The combined oily layer and the acid aqueous solution are added with a 10% aqueous solution of sodium bicarbonate and the free base extracted with diethyl ether. The ether extracts are dried over anhydrous sodium sulfate, filtered and added with an anhydrous solution of hydrogen chloride in diethyl ether and filtered. The filtrate is concentrated to dryness, the residue is taken up with a 10% aqueous solution of sodium carbonate and the free base again extracted with diethyl ether. The ether solution is decolorized with charcoal, filtered, dried over anhydrous sodium sulfate, then the solvent is removed by distilling it in vacuo. The residue is crystallized from petroleum ether, yield 12.7 g., M.P. 90–92° C. $[\alpha]_D^{20}$ +109.8° (c.=1 in chloroform).

EXAMPLE 5

Preparation of (−) 1-phenyl-1-benzyl-2-methyl-3-dimethylaminopropyl p-chloro-benzoate It is prepared according to the same process described under Example 4, from 8 g. of (−) 1-phenyl-1-benzyl-2-methyl-3-dimethylaminopropanol and 5.6 g. of p-chlorobenzoyl chloride, yield 10.4 g., M.P. 90–92° C. $[\alpha]_D^{20}$ −116.2° (c.=1 in chloroform).

EXAMPLE 6

Preparation of (+) 1-phenyl-1-benzyl-2-methyl-3-dimethylaminopropyl p-fluoro-benzoate An amount of 26 g. of (+) 1-phenyl-1-benzyl-2-methyl-3-dimethylaminopropanol and 14.8 g. of p-fluoro-benzoyl chloride are refluxed in 200 ml. of dioxane for 8 hours. The mixture is allowed to stand 2 days at room temperature, then filtered. The solvent is distilled off in vacuo and the residue is taken up with a 10% sodium bicarbonate solution. The mixture is extracted twice with diethyl ether, and the combined ether extracts dried over sodium sulphate and filtered. To the filtered liquid a solution of 10 g. of oxalic acid in the same solvent is added, and the precipitated white crystals are collected.

The precipitate is then suspended in a 10% sodium bicarbonate solution, and the suspension is extracted repeatedly with diethyl ether. The combined ether extracts are washed with water and evaporated to dryness. The residue, consisting of (+) 1-phenyl-1-benzyl-2-methyl-3-dimethylaminopropyl p-fluoro-benzoate is recrystallized from petroleum ether. Yield 26.5 g. (71%), M.P. 107–109° C., $[\alpha]_D^{20}$ +103.4 (c.=1 in chloroform).

EXAMPLE 7

Preparation of (+) 1-phenyl-1-benzyl-2-methyl-3-dimethylaminopropyl p-methoxyphenyl-acetate To 9.2 g. of p-methoxyphenyl-acetyl chloride in 120 ml. of anhydrous benzene, a solution of 16 g. of (+) 1-phenyl-1-benzyl-2-methyl-3-dimethylaminopropanol in 80 ml. of anhydrous benzene are added. The solution is refluxed for 9 hours, then allowed to stand at room temperature overnight. The mixture is filtered and the filtrate is concentrated to dryness in vacuo. The residue is dissolved in diethyl ether and precipitated with a solution of oxalic acid in the same solvent.

The precipitate is filtered, then is suspended in an aqueous solution of sodium bicarbonate. The suspension is extracted with diethyl ether, and the organic layer separated, and dried over sodium sulphate. A solution of maleic acid in diethyl ether is added, and the formed oily product, is separated and crystallized from isopropyl alcohol. This is (+) 1-phenyl-1-benzyl-2-methyl-3-dimethylaminopropyl p-methoxyphenyl-acetate maleate. Yield 11.5 (65%), M.P. 127–128° C., $[\alpha]_D^{20}$ +59.6 (c.=1 in chloroform).

EXAMPLES 8 to 17

The following compounds are prepared substantially as described in the previous examples.

| Example | Compound | M.P., °C. | $\alpha_D^{20}$ | |
|---|---|---|---|---|
| 8 | (−) 1-phenyl-1-benzyl-2-methyl-3-dimethylaminopropyl p-fluoro-benzoate | 107–109 | −111.8 | (c.=1 in chloroform). |
| 9 | (+) 1-phenyl-1-benzyl-2-methyl-3-dimethylaminopropyl p-nitro-benzoate, hydrochloride | 190–192 | +48.2 | Do. |
| 10 | (−) 1-phenyl-1-benzyl-2-methyl-3-dimethylaminopropyl p-nitro-benzoate, hydrochloride | 190–192 | −47.0 | Do. |
| 11 | (+) 1-phenyl-1-benzyl-2-methyl-3-dimethylaminopropyl p-ethoxy-benzoate, hydrochloride | 117–120 | +118.2 | (c.=0.68 in $H_2O$). |
| 12 | (−) 1-phenyl-1-benzyl-2-methyl-3-dimethylaminopropyl p-ethoxy-benzoate, hydrochloride | 118–120 | −116.4 | (c.=0.57 in $H_2O$). |
| 13 | (+) 1-phenyl-1-benzyl-2-methyl-3-dimethylaminopropyl phenyl-acetate, acid maleate | 120–121 | +62.0 | (c.=1 in chloroform). |
| 14 | (−) 1-phenyl-1-benzyl-2-methyl-3-dimethylaminopropyl phenyl-acetate, acid maleate | 120–121 | −54.4 | Do. |
| 15 | (−) 1-phenyl-1-benzyl-2-methyl-3-dimethylaminopropyl p-methoxyphenyl-acetate, maleate | 127–128 | −63.6 | Do. |
| 16 | (+) 1-phenyl-1-benzyl-2-methyl-3-dimethylaminopropyl chlorophenyl-acetate | 130–131 | +95.0 | Do. |
| 17 | (+) 1-phenyl-1-benzyl-2-methyl-3-dimethylaminopropyl p-isobutylphenyl-acetate, oxalate | 120–122 | +53.5 | (c.=0.38% in methanol). |
| 18 | (−) 1-phenyl-1-benzyl-2-methyl-3-dimethylaminopropyl p-isobutylphenyl-acetate, oxalate | 120–122 | −61.6 | (c.=0.51% in methanol). |

We claim:
1. A compound of the formula:

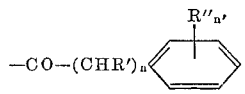

and the pharmaceutically acceptable salts thereof, wherein R is an acyl radical of the formula

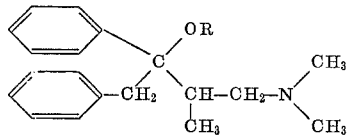

wherein $n$ is an integer from 0 to 1, R' is a member of the class consisting of hydrogen, fluoro and chloro, and R" is a member of the class consisting of hydrogen, chloro, fluoro, nitro, lower alkyl of 1 to 4 carbon atoms, methoxy and ethoxy.

2. A compound as in claim 1, wherein the basic ester is (+) 1 - phenyl - 1 - benzyl-2-methyl-3-dimethylaminopropyl fluorophenyl-acetate.

3. A compound as in claim 1, wherein the basic ester is (+) 1 - phenyl - 1-benzyl-2-methyl-3-dimethylaminopropyl p-chloro-benzoate.

4. A compound as in claim 1, wherein the basic ester is (−) 1-phenyl-1-benzyl-2-methyl-3-dimethylaminopropyl p-chloro-benzoate.

References Cited
UNITED STATES PATENTS

| 2,989,533 | 6/1961 | Steers et al. | 260—472 |
| 2,954,383 | 9/1960 | Schlesinger et al. | 260—477 |
| 2,649,445 | 8/1953 | Speeter | 260—477 |
| 829,374 | 8/1906 | Fourneau | 260—477 |

JAMES A. PATTEN, Primary Examiner

J. L. DAVISON, Assistant Examiner

U.S. Cl. X.R.

260—472, 473 G; 424—308, 309, 310

UNITED STATES PATENT OFFICE
CERTIFICATE OF CORRECTION

Patent No. 3,637,808　　　　　　　　Dated January 25, 1972

Inventor(s) LUIGI FONTANELLA et al.

It is certified that error appears in the above-identified patent and that said Letters Patent are hereby corrected as shown below:

Claim 1 is corrected to read as follows:

A compound of the formula:

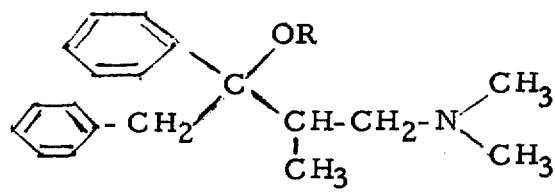

and the pharmaceutically acceptable salts thereof, wherein R is an acyl radical of the formula

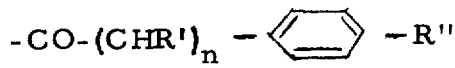

wherein n is an integer from 0 to 1, R' is a member of the class consisting of hydrogen, fluoro and chloro, and R" is a member of the class consisting of hydrogen, chloro, fluoro, nitro, lower alkyl of 1 to 4 carbon atoms, methoxy and ethoxy.

Signed and sealed this 10th day of September 1974

(SEAL)
Attest:

McCOY M. GIBSON, JR.　　　　　　　　C. MARSHALL DANN
Attesting Officer　　　　　　　　　　Commissioner of Patents